US012590691B1

(12) United States Patent
Shu

(10) Patent No.: US 12,590,691 B1
(45) Date of Patent: Mar. 31, 2026

(54) LIGHT STRIP

(71) Applicant: Congchao Shu, Xiangxiang City (CN)

(72) Inventor: Congchao Shu, Xiangxiang City (CN)

( * ) Notice: Subject to any disclaimer, the term of this patent is extended or adjusted under 35 U.S.C. 154(b) by 0 days.

(21) Appl. No.: 19/277,496

(22) Filed: Jul. 23, 2025

(51) Int. Cl.
*F21V 19/00* (2006.01)
*F21L 4/08* (2006.01)
*F21V 7/05* (2006.01)
*F21V 21/096* (2006.01)
*F21V 23/04* (2006.01)
*F21Y 103/10* (2016.01)

(52) U.S. Cl.
CPC .............. *F21V 19/006* (2013.01); *F21L 4/08* (2013.01); *F21V 7/05* (2013.01); *F21V 21/0965* (2013.01); *F21V 23/0414* (2013.01); *F21V 2200/20* (2015.01); *F21Y 2103/10* (2016.08)

(58) Field of Classification Search
CPC .................................................. F21V 21/0965
See application file for complete search history.

(56) References Cited

U.S. PATENT DOCUMENTS

| | | | | |
|---|---|---|---|---|
| 8,115,411 | B2 * | 2/2012 | Shan | F21V 29/74 315/307 |
| 9,228,727 | B2 * | 1/2016 | May | F21K 9/272 |
| 9,702,531 | B2 * | 7/2017 | Gorman | F21V 19/003 |
| 2013/0135852 | A1 * | 5/2013 | Chan | F21V 21/002 362/221 |
| 2015/0292691 | A1 * | 10/2015 | Li | F21V 23/0421 362/183 |
| 2016/0178137 | A1 * | 6/2016 | Jiang | F21V 3/061 362/221 |
| 2017/0227173 | A1 * | 8/2017 | May | F21S 9/022 |
| 2023/0236355 | A1 * | 7/2023 | Doubek | G02B 6/005 362/606 |
| 2023/0250929 | A1 * | 8/2023 | Doubek | G02B 6/0081 362/633 |

* cited by examiner

*Primary Examiner* — Eric T Eide
(74) *Attorney, Agent, or Firm* — Nicholas Makridakis

(57) ABSTRACT

A light strip is provided, including a frame and a lamp panel. A groove is provided on an inner wall of the frame, and the lamp panel is fixed in the groove. A transparent cover is fixedly provided at a top of the frame. By fixing the lamp panel within the groove and applying adhesive for fixation, which will not loosen even when subjected to external impacts such as bumps or accidental detachment during the process of changing usage scenarios. Moreover, the frame is made of aluminum, which further can enhance the overall strength of the light strip, thereby improving its service life and also ensuring long-term operation.

6 Claims, 4 Drawing Sheets

LIGHT STRIP

TECHNICAL FIELD

The present disclosure relates to the technical field of light strips, and in particular to a novel light strip.

BACKGROUND

Light strips are widely used in daily life because they may be easily changed for different usage scenarios. For example, the light strips may be used to decorate the atmosphere of a space, such as dining tables and bedroom lights, to enhance the atmosphere. Alternatively, the light strips may be fixed above the desk, occupying no space while also providing illumination.

However, structures of the existing light strips are configured to only fix the internal components randomly, resulting in poor fixation. During frequent movement and changes in usage scenarios, it is inevitable to be impacted by external forces such as bumps and accidental detachment. After long-term use, the internal components are prone to loosening, which affects the service life and thus causing inability to work for a long time.

SUMMARY

The present disclosure aims to provide a novel light strip to address the technical problems of existing technologies that the internal components are prone to loosening after long-term use due to external impacts such as bumps and accidental detachment during the process of changing usage scenarios.

To achieve the above objectives, the present disclosure adopts the following technical solutions.

In some embodiments of the present disclosure, a kind of light strip is provided, including a frame and a lamp panel. Herein a groove is provided on an inner wall of the frame, and the lamp panel is fixed in the groove. A transparent cover is fixedly provided at a top of the frame.

In some preferred embodiments of the present disclosure, a light guide plate is fixedly provided in the frame, a bottom of the light guide plate is fixedly connected with a reflecting plate, and the lamp panel is located on a side wall of the light guide plate.

In some preferred embodiments of the present disclosure, the light strip further includes a first end cap and a second end cap, and the first end cap and the second end cap are fixedly connected at both ends of the frame by screws.

In some preferred embodiments of the present disclosure, a PCB board is fixedly disposed in the first end cap, and the PCB board is provided with a button.

In some preferred embodiments of the present disclosure, the inner wall of the frame is provided with a second slot, the first end cap is provided with a second male tab, and the second male tab is inserted into the second slot.

In some preferred embodiments of the present disclosure, the light strip further includes a magnet and a mounting base, and the magnet is located in the mounting base. A first slot is provided in the inner wall of the frame, and a side wall of the mounting base is provided with a first male tab. And the first male tab is inserted into the first slot.

In some preferred embodiments of the present disclosure, the magnet and the mounting base are provided with two groups, respectively.

In some preferred embodiments of the present disclosure, the lamp panel is provided with two groups.

In some preferred embodiments of the present disclosure, the frame is internally provided with a battery.

Compared with the existing technologies, the light strip of the present disclosure has at least the following beneficial effects.

1. The light strip of the present disclosure, by fixing the lamp panel within the groove and applying adhesive for fixation, which will not loosen even when subjected to external impacts such as bumps or accidental detachment during the process of changing usage scenarios. Moreover, the frame is made of aluminum, which further can enhance the overall strength of the light strip, thereby improving its service life and also ensuring long-term operation.

2. The light strip of the present disclosure, by designing the second male tab to be inserted into the second slot, and ensuring that both sides of the top of the first end cap are in contact with the inner wall of the frame, the first end cap can be prevented from accidentally shaking during use to affect the internal PCB board, thereby improving its service life.

Figure 1:
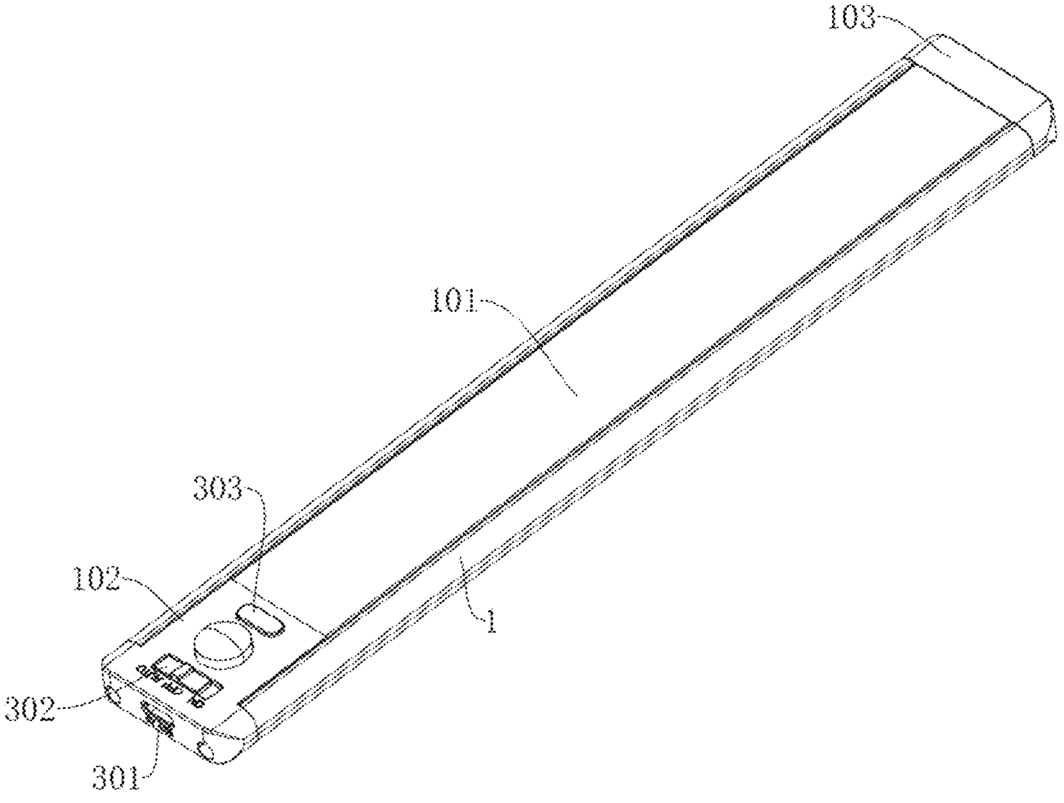
FIG. 1 shows a structural schematic diagram of a light strip in accordance with some embodiments of the present disclosure.

In the drawings, reference numerals are as follows. 1. Frame, 101. Transparent cover, 102. First end cap, 103. Second end cap, 2. Lamp panel. 201. Light guide plate, 202. Reflecting plate, 3. PCB board, 301. Interface, 302. Switch, 303. Button, 4. Battery, 5. Magnet, 501. Mounting base, 6. First slot, 601. First male tab, 7. Second male tab, 701. Second slot, 8. Groove.

DETAILED DESCRIPTION OF THE EMBODIMENTS

The following will provide a clear and complete description of the technical solutions in the embodiments of the present disclosure in conjunction with the accompanying drawings. Obviously, the described embodiments are only a part of the embodiments of the present disclosure, but not all of them.

In the description of the present disclosure, it should be understood that the terms "up", "down", "front", "back", "left", "right", "top", "bottom", "inside", "outside" and other directional or positional relationships are indicated are based on the directional or positional relationships shown in the accompanying drawings, only for the convenience of describing the present disclosure and simplifying the description, and do not indicate or imply that the device or component referred to must have a specific orientation, be constructed and operated in a specific orientation, and therefore cannot be understood as limiting the present disclosure.

EMBODIMENTS

Referring to FIG. 1 to FIG. 4, in some embodiments of the present disclosure, a light strip is provided, including a frame 1 and a lamp panel 2. The frame 1 is made of aluminum material, a groove 8 is provided on an inner wall of the frame 1, and the lamp panel 2 is fixed in the groove 8.

The groove 8 is arranged on the both sides of the inner wall of the frame 1, the lamp panel 2 is provided with in two groups, and the two groups of lamp panels 2 are configured to clamp within the groove 8, respectively. The lamp panels 2 are coated with glue on the back thereon and clamped within the groove 8, so as to fix to the inner wall of the frame 1.

A top of the frame 1 is fixedly provided with a transparent cover 101, which is made of transparent plastic material.

The lamp panel 2 is provided with TED light beads.

By using the frame 1, the light strap of the present disclosure is fixed with other objects. When in use, the lamp panel 2 emits light and the light is configured to emit through the transparent cover 101, so as to achieve lighting or adjust the atmosphere.

By fixing the lamp panel 2 within the groove 2 and applying glue for fixation, it will not loosen even when subjected to external impacts such as bumps or accidental detachment during the process of changing usage scenarios. Moreover, the frame 1 is made of aluminum material, which can further enhance the overall strength of the light strip of the present disclosure, thereby improving its service life, and also ensuring long-term operation.

Figure 3:
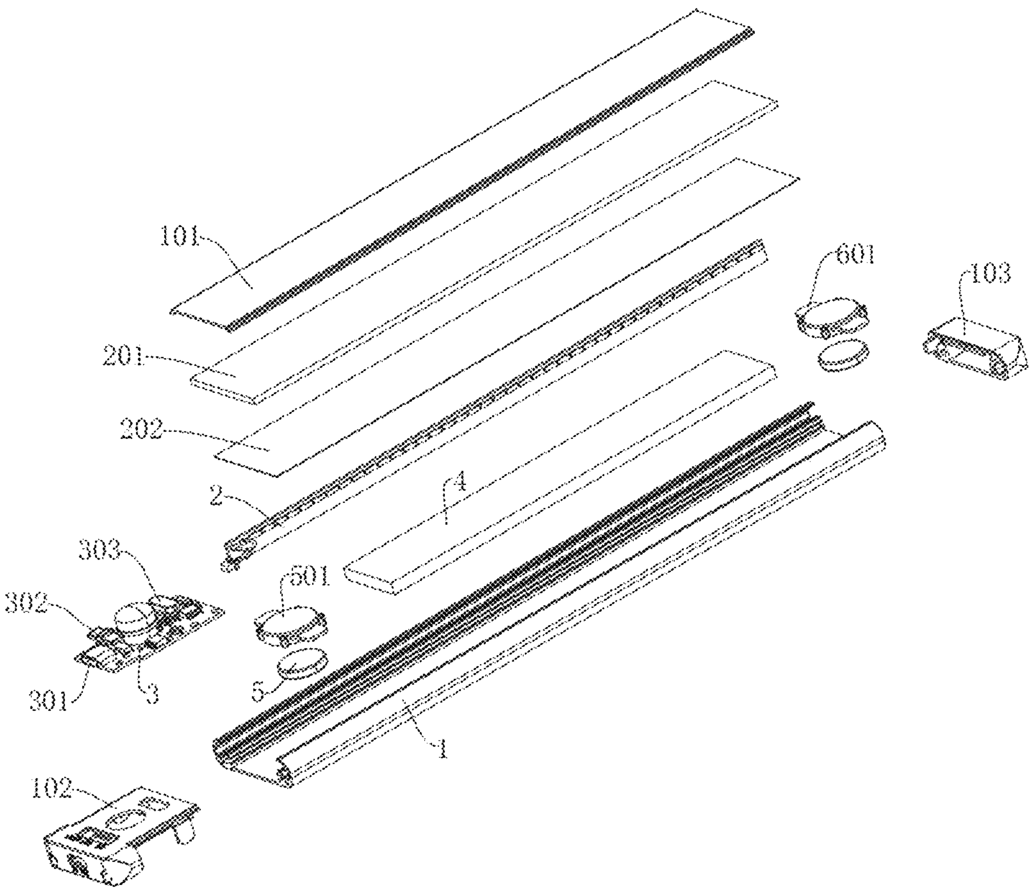
FIG. 3 shows an exploded view of the light strip in accordance with some embodiments of the present disclosure.

Referring to FIG. 3, a light guide plate 201 is fixedly disposed in the frame 1, a bottom of the light guide plate 201 is fixedly connected to a reflecting plate 202, and a top of the light guide plate 201 is attached to the transparent cover 101.

The lamp panel 2 is located on a side wall of the light guide plate 201.

After the lamp panel 2 emits light, it shines on the light guide plate 201. Some of the light is reflected by the reflecting plate 202 and then emitted, improving the brightness and saturation of the light.

Referring to FIG. 1 to FIG. 4, in some embodiments of the present disclosure, the light strip further includes a first end cap 102 and a second end cap 103, and the first end cap 102 and the second end cap 103 are fixedly connected at both ends of the frame 1 by screws.

The material of the first end cap 102 and the second end cap 103 is the same as that of the frame 1, both made of aluminum.

Two ends of the frame 1 are designed to be open for easy installation of internal components, and then the two ends of the frame 1 are sealed and fixed by the first end cap 102 and the second end cap 103.

Referring to FIG. 1 and FIG. 3, the first end cap 102 is internally and fixedly connected with a PCB board 3, which is electrically connected to the lamp panel 2. The PCB board 3 is provided with an interface 301, a switch 302, and a button 303.

When in use, by operating the switch 302 to turn on and off the lamp panel 2.

By setting the PCB board, different brightness levels of the lamp panel 2 can be achieved when the button 302 is pressed.

The interface 301, the switch 302, and the button 303 all go across through the first end cap 102 and extend to the outside.

Figure 4:
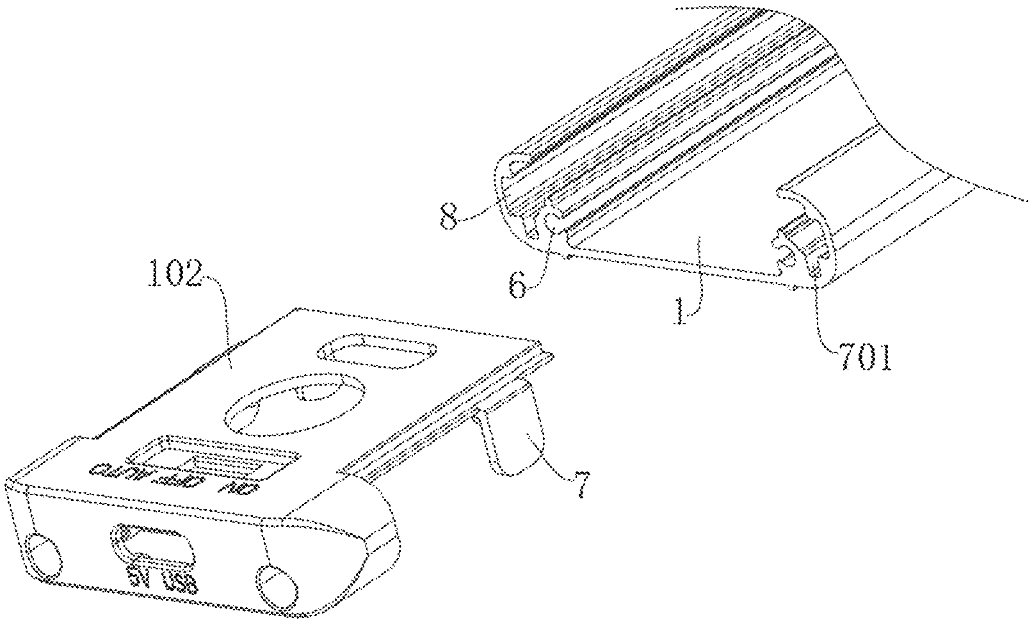
FIG. 4 shows a structural schematic diagram of a frame of the light strip in accordance with some embodiments of the present disclosure.

Referring to FIG. 3 and FIG. 4, the inner wall of the frame 1 is provided with a second slot 701, the first end cap 102 is provided with a second male tab 7, and the second male tab 7 is inserted into the second slot 701.

Preferably, the second slot 701 is disposed on the inner wall of both side of the frame 1, both ends of the first end cap 102 are provided with second male tabs 7, and the second male tabs 7 are integrally formed with the first end cap 102.

Due to the PCB board 3 is disposed in the first end cap 102, frequent contact and use are required. In this case, when installing the first enc cap 102, referring to FIG. 4, first insert it into the second slot 701, and then both sides of the top of the first end cap 102 are simultaneously attached to the inner wall of the top of the frame 1. Finally, the screws are used to fix the first end cap 102 to the frame 1.

By inserting the second male tab 7 into the second slot 701, and the two sides of the top of the first enc cap 102 are simultaneously attached to the inner wall of the top of the frame 1, which can avoid accidental shaking of the first end cap 102 during use, and affect the internal PCB board 3, thereby improving its service life.

Figure 2:
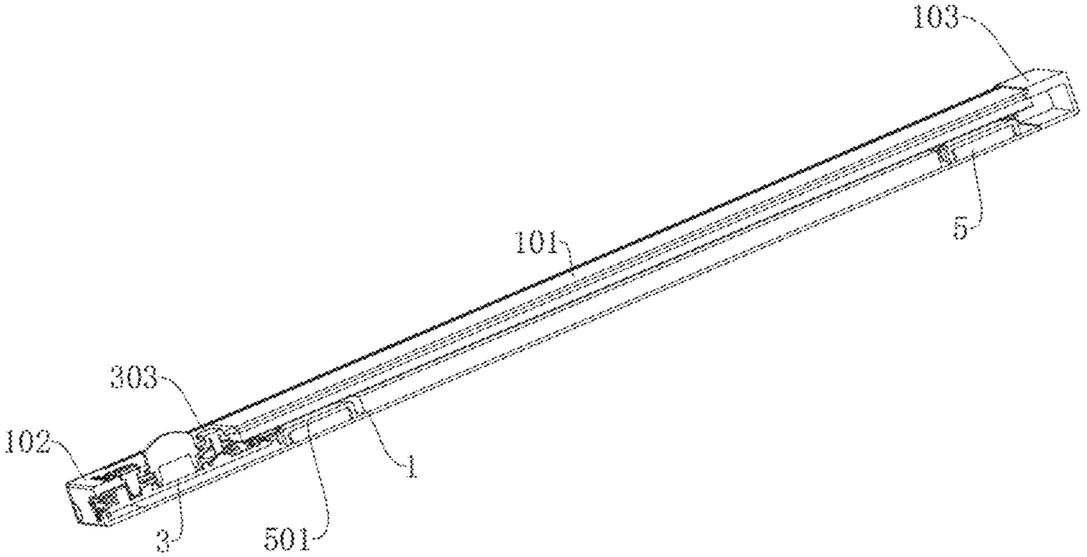
FIG. 2 shows a section view of the light strip in accordance with some embodiments of the present disclosure.

Referring to FIG. 2 and FIG. 3, in some embodiments of the present disclosure, the light strip of the present disclosure further includes a magnet 5 and a mounting base 501, and the magnet 5 is located in the mounting base 501.

The inner wall of the frame 1 is provided with a first slot 6, a side wall of the mounting base 501 is provided with a first male tab 601, and the first male tab 601 is inserted into the first slot 6. In this case, the top of the magnet 5 is contact with the top of the mounting base 501, and the bottom of the magnet 5 is in contact with the inner wall of the bottom of the frame 1.

The magnet 5 and the mounting base 501 are provided with two groups, respectively.

Both sides of the magnet 5 are configured to be coated with glue. After installation, the magnet 5 is fixed together with the mounting base 501 and the frame 1 to avoid accidental sliding during use and thereby improving stability.

The frame 1 is configured to achieve magnetic fixation with other metal objects through the magnet 5.

The frame 1 is also internally provided with a battery 4, which is fixed to the frame 1 with glue, and the battery 4 is located between the two groups of mounting bases 501 to supply power to the lamp panel 2 and the PCB board 3.

The interface 301 is configured to charge the battery 4.

The above is only some preferred specific implementation of the present disclosure, but the scope of protection of the present disclosure is not limited to this. Any equivalent substitutions or changes made by one of ordinary skill in the art based on the technical solutions and concept of the present disclosure shall be included in the scope of protection of the present invention.

What is claimed is:

1. A kind of light strip, comprising a frame and a lamp panel;

wherein grooves are respectively provided on both sides of an inner wall of the frame, the lamp panel is provided with in two groups, two groups of lamp panels are configured to be respectively clamped into the grooves, and a transparent cover is fixedly provided at a top of the frame to form a rectangular structure;

wherein a light guide plate is fixedly provided in the frame, a bottom of the light guide plate is fixedly connected with a reflecting plate, the light guide plate and the reflecting plate are arranged parallel to each other, and the two groups of lamp panels are located on two side walls of the light guide plate; and wherein the light strip further comprises a magnet and a mounting base, and the magnet is located in the mounting base; wherein a first slot is provided in the inner wall of the frame, and a side wall of the mounting base is provided with a first male tab; and wherein the first male tab is inserted into the first slot.

2. The light strip according to claim 1, wherein further comprises a first end cap and a second end cap, and the first end cap and the second end cap are fixedly connected at both ends of the frame by screws.

3. The light strip according to claim 2, wherein a PCB board is fixedly disposed in the first end cap, and the PCB board is provided with a button.

4. The light strip according to claim 3, wherein the inner wall of the frame is provided with a second slot, the first end cap is provided with a second male tab, and the second male tab is inserted into the second slot.

5. The light strip according to claim 1, wherein the magnet and the mounting base are provided with two groups, respectively.

6. The light strip according to claim 1, wherein the frame is internally provided with a battery.

* * * * *